US012589945B2

(12) United States Patent (10) Patent No.: US 12,589,945 B2
Hannold et al. (45) Date of Patent: Mar. 31, 2026

(54) RESILIENT LINK FOR CONVEYOR CHAIN

(71) Applicant: Joy Global Underground Mining LLC, Warrendale, PA (US)

(72) Inventors: Nathan M. Hannold, Franklin, PA (US); Joseph D. Hoover, Hermitage, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 86 days.

(21) Appl. No.: 18/462,906

(22) Filed: Sep. 7, 2023

(65) Prior Publication Data

US 2025/0083900 A1      Mar. 13, 2025

(51) Int. Cl.
B65G 17/40 (2006.01)

(52) U.S. Cl.
CPC .................................... B65G 17/40 (2013.01)

(58) Field of Classification Search
CPC ........ B65G 17/40; B65G 19/20; B65G 17/26; B65G 17/38; B65G 19/00
See application file for complete search history.

(56) References Cited

U.S. PATENT DOCUMENTS

| | | | |
|---|---|---|---|
| 2,365,229 A | 12/1944 | Vanderzee | |
| 4,353,459 A * | 10/1982 | Petershack | B65G 17/08 |
| | | | 59/91 |
| 4,766,995 A | 8/1988 | Sterwerf, Jr. | |
| 6,662,932 B1 | 12/2003 | O'Neill | |

| | | | |
|---|---|---|---|
| 8,016,102 B2 | 9/2011 | Morris | |
| 8,177,049 B2 | 5/2012 | O'Neill | |
| 8,453,826 B2 | 6/2013 | Morris | |
| 9,033,140 B2 * | 5/2015 | Studer | B65G 17/26 |
| | | | 198/850 |
| 9,487,358 B2 * | 11/2016 | Morris | B65G 19/20 |
| 11,235,933 B2 * | 2/2022 | Fye | B65G 17/40 |
| 2013/0277183 A1 | 10/2013 | Studer | |
| 2016/0348755 A1 * | 12/2016 | Ritz | F16G 13/08 |
| 2018/0251310 A1 * | 9/2018 | Walker | B65G 17/26 |

(Continued)

FOREIGN PATENT DOCUMENTS

| | | | | |
|---|---|---|---|---|
| CN | 114506362 A | 5/2022 | | |
| EP | 1975093 A1 * | 10/2008 | ............. | B65G 17/40 |
| GB | 2351543 A * | 1/2001 | ............. | F16G 13/06 |

(Continued)

OTHER PUBLICATIONS

IPSearch History Oct. 31, 2025 UTC; InnovationQ+; https://iq.ip.com/discover (Year: 2025).*

(Continued)

*Primary Examiner* — Gene O Crawford
*Assistant Examiner* — Abby A Jorgensen
(74) *Attorney, Agent, or Firm* — Husch Blackwell LLP

(57) ABSTRACT

A link is provided for a conveyor chain that is configured to convey material in a direction of travel. The link includes a first end coupled to a first adjacent link, a second end opposite the first end and coupled to a second adjacent link, and a deformable portion positioned between the first end and the second end. The deformable portion is configured to elastically deform in response to loads exerted in a direction parallel to the direction of travel of the conveyor chain, thereby changing a distance between the first end and the second end.

24 Claims, 12 Drawing Sheets

(56) References Cited

U.S. PATENT DOCUMENTS

2018/0251313 A1 * 9/2018 Walker .................. B65G 17/06
2022/0234835 A1 * 7/2022 Hoover .................. F16G 13/06

FOREIGN PATENT DOCUMENTS

| | | | | |
|---|---|---|---|---|
| JP | H0624533 A | 2/1994 | | |
| JP | 2675944 B2 * | 11/1997 | .......... | B65G 17/086 |
| WO | WO-9008716 A1 * | 8/1990 | ............ | F16G 13/06 |
| WO | WO-2018165213 A1 * | 9/2018 | ............ | B65G 19/08 |

OTHER PUBLICATIONS

Combined Search and Examination Report for corresponding UK application No. 2412901.7, dated Feb. 14, 2025 ( 6 pages).

* cited by examiner

RESILIENT LINK FOR CONVEYOR CHAIN

BACKGROUND

The application relates to conveyor chains, and particularly to a resilient link for a conveyor chain.

SUMMARY

Mining machines such as continuous miners and chain haulage units may include chain conveyors including a continuous loop of chain links. The chain conveyors may include flight members for pushing or urging material along a pan. The chain may be driven by one or more sprockets.

In one independent aspect, a link is provided for a conveyor chain. The conveyor chain is configured to convey material in a direction of travel. The link includes a first end configured to be coupled to a first adjacent link, a second end opposite the first end and configured to be coupled to a second adjacent link, and a deformable portion positioned between the first end and the second end. The deformable portion is configured to elastically deform in response to loads exerted in a direction parallel to the direction of travel of the conveyor chain, thereby changing a distance between the first end and the second end.

In another independent aspect, a link assembly is provided for a conveyor chain configured to convey material in a direction of travel. The link assembly includes a resilient link and a limiting body. The resilient link includes a first end configured to be coupled to a first adjacent link, and a second end opposite the first end. The second end is configured to be coupled to a second adjacent link. The resilient link is configured to elastically deform in response to loads exerted in a direction parallel to the direction of travel of the conveyor chain thereby changing a distance between the first end and the second end. The limiting body includes a first limiting body end configured to be coupled to the first end of the resilient link, and a second limiting body end configured to be coupled to the second end of the resilient link. The first limiting body end and the second limiting body end are configured to inhibit the distance between the first end of the resilient link and the second end of the resilient link from moving outside of a predetermined range.

In yet another independent aspect, a conveyor chain configured to convey material in a direction of travel includes a first flight link, a second flight link, and a resilient link. The first flight link includes a flight bar extending laterally away from a centerline of the conveyor chain, and the second flight link includes a flight bar extending laterally away from the centerline of the conveyor chain. The resilient link includes a first end, a second end opposite the first end, and a deformable portion positioned between the first end and the second end. The deformable portion is configured to elastically deform in response to loads exerted in a direction parallel to the direction of travel of the conveyor chain, thereby changing a distance between the first end and the second end.

DETAILED DESCRIPTION

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling.

Figure 1:
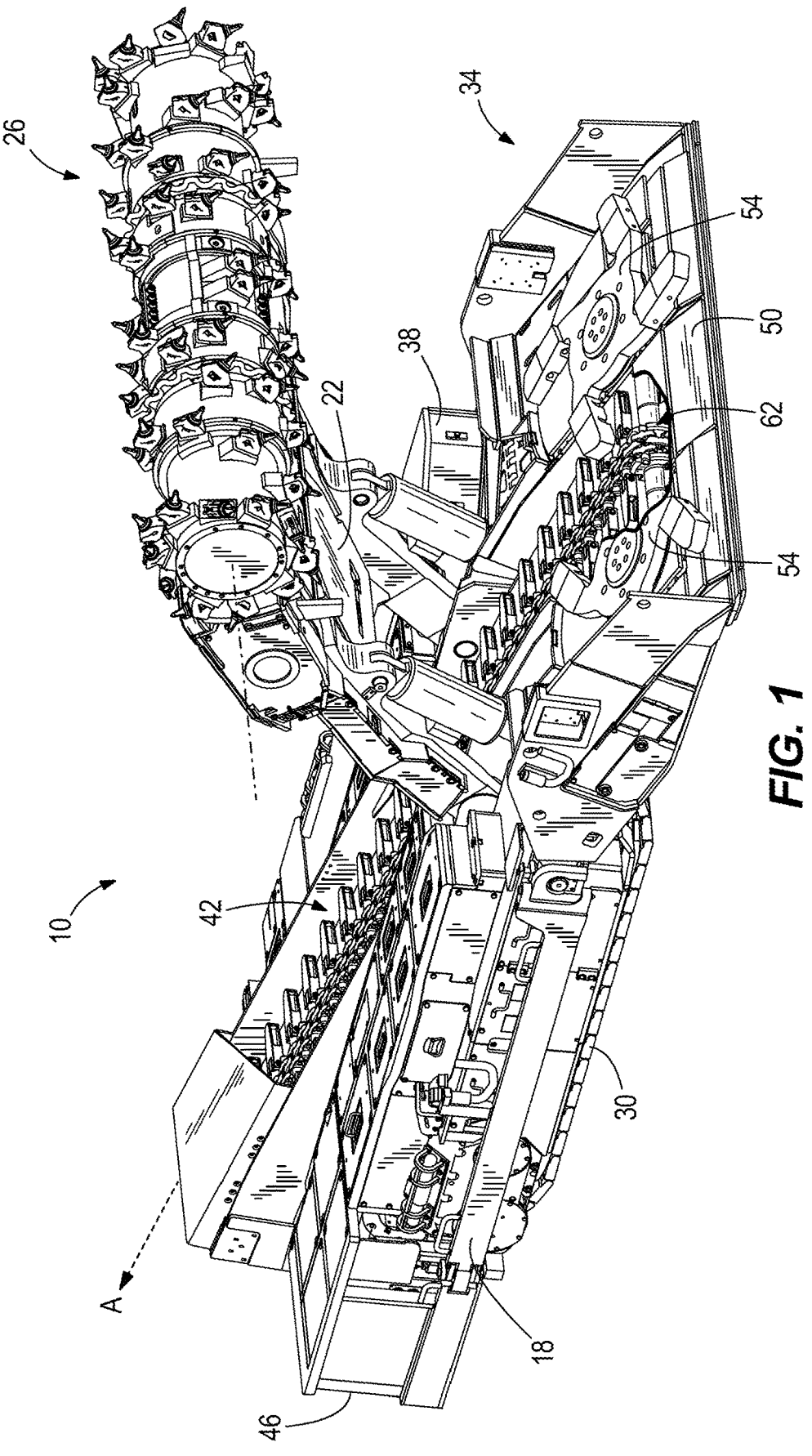
FIG. 1 is a perspective view of an exemplary mining machine.

FIG. 1 illustrates a mining machine 10, such as a continuous mining machine. In the illustrated embodiment, the mining machine 10 includes a frame or chassis 18, a boom 22 pivotably coupled to the chassis 18, and a cutter head 26 supported on the boom 22. The chassis 18 may be supported for movement relative to a support surface (not shown) by a traction mechanism (e.g., crawlers 30).

As shown in FIG. 1, a gathering head 34 is positioned adjacent a first end or forward end 38 of the chassis 18, and a conveyor 42 extends in a continuous loop from the forward end 38 of the chassis 18 toward a second or rear end 46 of the chassis 18. The gathering head 34 is positioned below the cutter head 26 and includes a deck 50 and a device (e.g., rotating arms 54) that directs dislodged material onto the conveyor 42. The conveyor 42 transports the cut material along a direction of travel A from the forward end 38 toward the rear end 46 of the chassis 18, from the area below the cutter head 26 to another conveyor or a haulage machine (not shown) positioned proximate the rear end 46 of the chassis 18.

The conveyor 42 is a chain conveyor formed by chain link connected sequentially in a continuous loop. The conveyor 42 drives cut material along a chain pan or deck. The conveyor 42 is driven by a drive assembly. In some embodiments, the drive assembly includes a shaft oriented laterally relative to the chassis 18 and is driven (e.g., by one or more motors) to rotate relative to the chassis 18, and a sprocket 62 (FIG. 1) is coupled to the shaft and drives the conveyor 42 due to rotation of the shaft.

Figure 2:
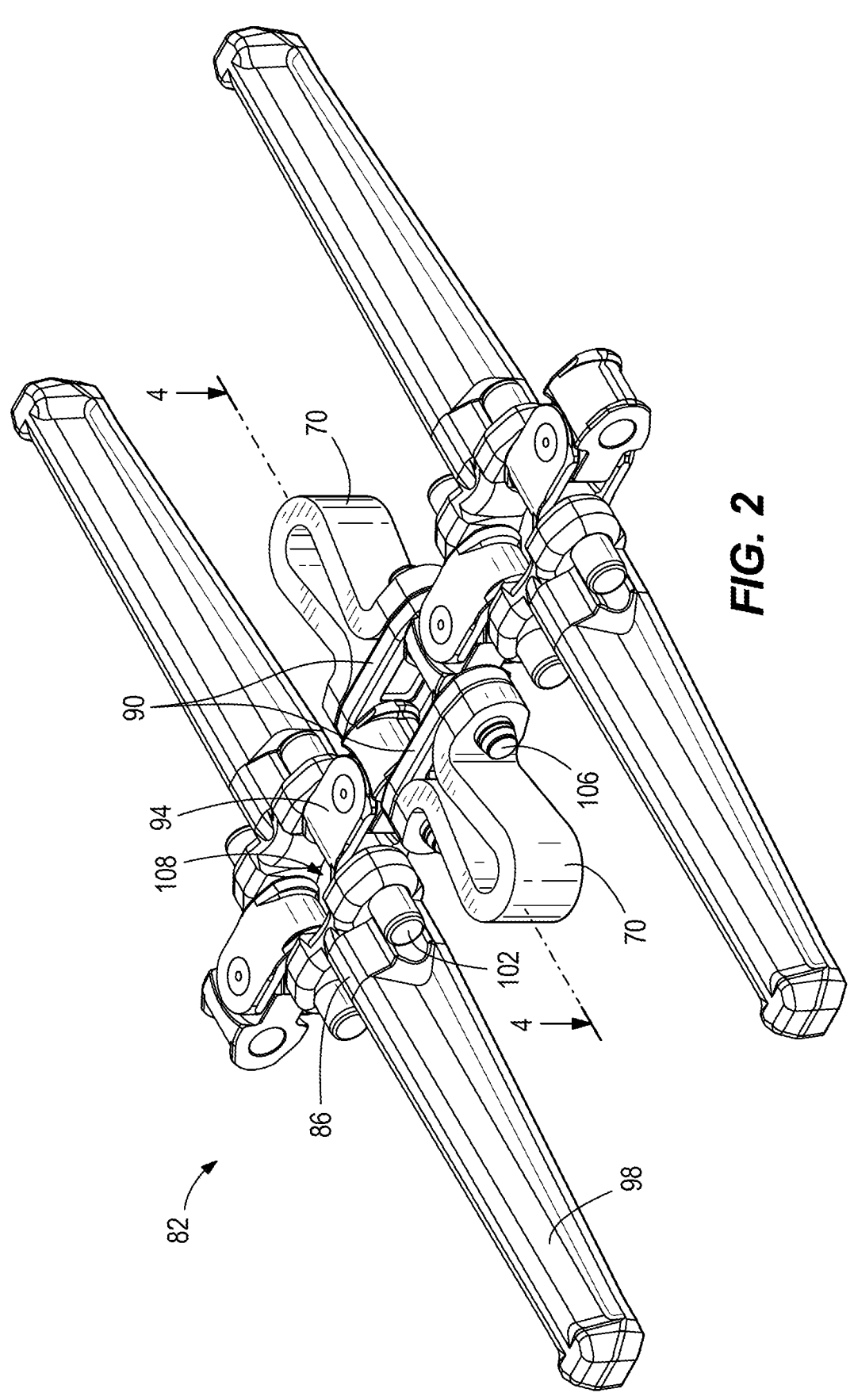
FIG. 2 is a perspective view of a portion of a chain conveyor.

FIG. 2 shows a portion of a chain 82 that forms the conveyor 42. In the illustrated embodiment, a portion of the conveyor chain 82 includes two pairs of flight links 86, and a pair of spring links 70 and a pair of side links 90 a coupled between the pairs of flight links 86. Each pair of flight links 86 is coupled to the spring links 70 and side links 90 by coupler links or connecting links 94. In the illustrated embodiment, each flight link 86 includes a flight or flight bar 98 protruding laterally outwardly, away from a centerline along which the chain 82 travels. Each flight link 86 is coupled to the adjacent connecting links 94 by flight pins 102, and each spring link 70 is coupled to the adjacent connecting links 94 by connecting pins 106. Connecting pins 106 further couple each side link 90 to its corresponding spring link 70 and the adjacent connecting links 94. A gap 108 is formed between adjacent connecting links 94, and the teeth of the sprocket 62 pass into the gap 108 between connecting links 94 to engage and drive the conveyor chain 82.

Figure 3:
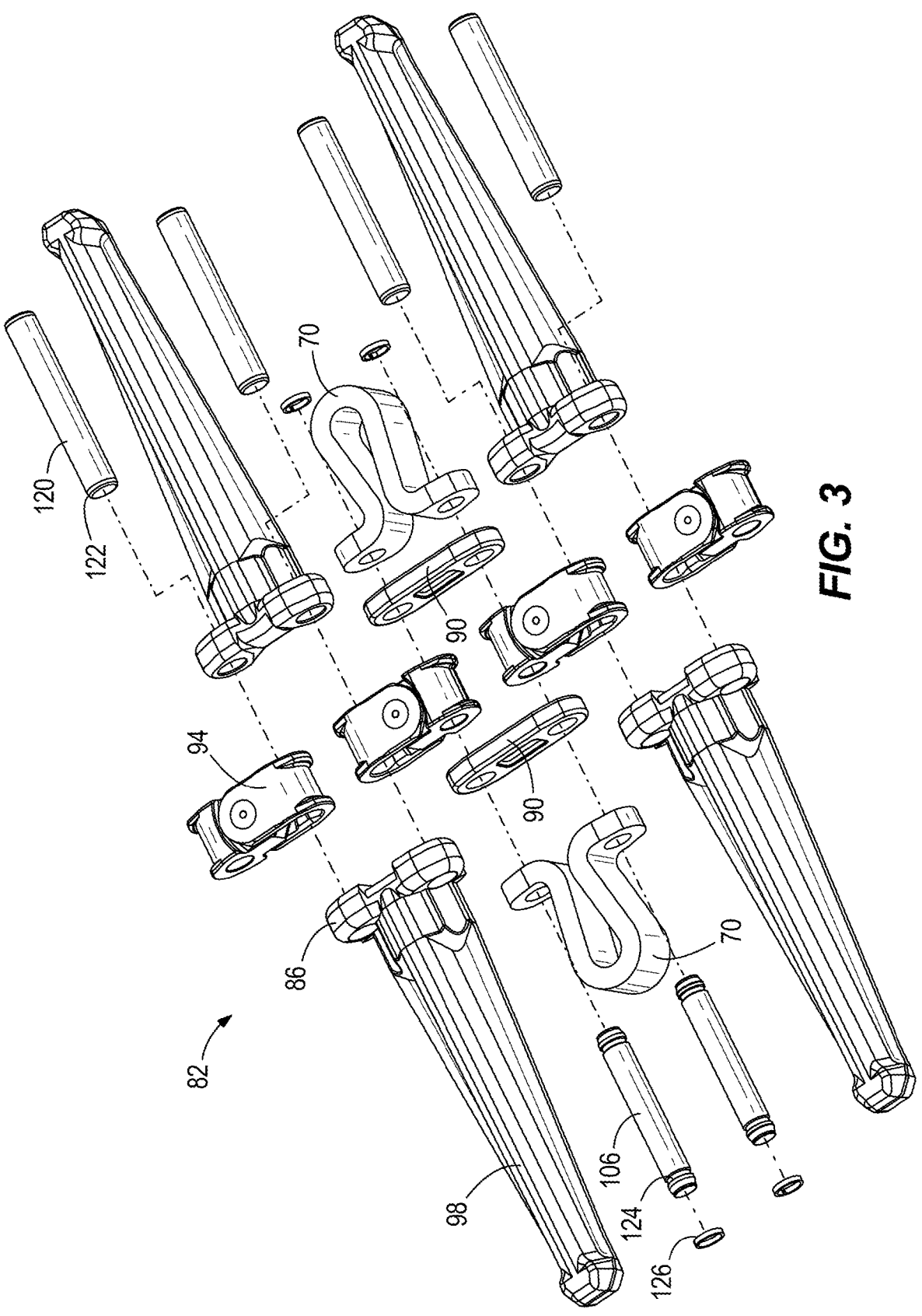
FIG. 3 is an exploded view of the portion of the chain conveyor of FIG. 2.

As shown in FIGS. 2 and 3, the flight pins 102 extend through the connecting link 94 and each end of the flight pins 102 is received within an end portion of one of the flight links 86. Similarly, the connecting pins 106 extend through the connecting link 94 and each end of the connecting pins 106 is received within one of the spring links 70 and/or side links 90. The flight pins 102 may be coupled to the flight links 86 in various ways, and the connecting pins 106 may be coupled to the spring links 70 in various ways. In some embodiments, each of the flight pins 102 and the connecting pins 106 includes a peripheral groove 122, 124, each of which extends around an outer surface adjacent an end of the associated flight pins 102 and connecting pins 106 and may receive a retainer 126. In some embodiments, the flight pins 102 may be coupled to the flight links 86 by welding. In some embodiments, the connecting pins 106 may be coupled to the spring links 70 by one or more of the mechanisms described in U.S. Pat. No. 10,717,603, filed Mar. 6, 2018, the entire contents of which are incorporated by reference herein.

In the illustrated embodiment, the conveyor chain 82 includes a sequence of alternating flight links 86, connecting links 94, and spring links 70 and/or side links 90. In other embodiments, the conveyor chain 82 may include a different sequence of links—for example, a spring link 70 may be placed between each pair of flight links 86 or spring links 70 may be spaced such that they are only placed between every other set of flight links 86 or any other variation of spacing. Various permutations of the link sequence are possible. Also, in the illustrated embodiment, the spacing between each flight pin 102 and an adjacent connecting pin 106 is different from the spacing between each flight pin 102 and an adjacent flight pin 102.

As shown in FIGS. 2 and 3, the flight pins 102 extend through the connecting link 94 and each end of the flight pins 102 is received within an end portion of one of the flight links 86. Similarly, the connecting pins 106 extend through the connecting link 94 and each end of the connecting pins 106 is received within one of the spring links 70 and/or side links 90. Each of the flight pins 102 and the connecting pins 106 includes a peripheral groove 122, 124, each of which extends around an outer surface adjacent an end of the associated flight pins 102 and connecting pins 106.

As shown in FIGS. 2-5, the spring link 70 includes pin openings 74 and is elastically deformable. When the spring link 70 experiences a load in a direction parallel to the direction of travel of the conveyor chain 82, the spring link 70 elastically deforms and a distance D between the pin openings 74 can change. In particular, when the spring link 70 experiences a tensile load, the distance D between the pin openings 74 increases. Consequently, when the spring link 70 is included in the conveyor chain 82, the spring link 70 can deformably expand or elongate when the conveyor chain 82 is subjected to an abrupt or sudden tensile load, and can return to its nominal or unloaded state when the load condition dissipates. The spring link 70 may be a damper or shock absorber for the conveyor chain 82 and assist in minimizing wear or breakage of the other components in the conveyor chain 82.

The spring link 70 may be elastically deformable, and may also be sufficiently rigid to transfer the loading forces of the conveyor chain 82 from one adjacent connecting link 94 to another adjacent connecting link 94. Moreover, the spring link 70 desirably has spring-like characteristics such that the distance D between the pin openings 74 can increase when the spring link 70 experiences a load condition and then returns to a standard distance $D_S$ when the spring link 70 is no longer experiencing the load.

Figure 4:
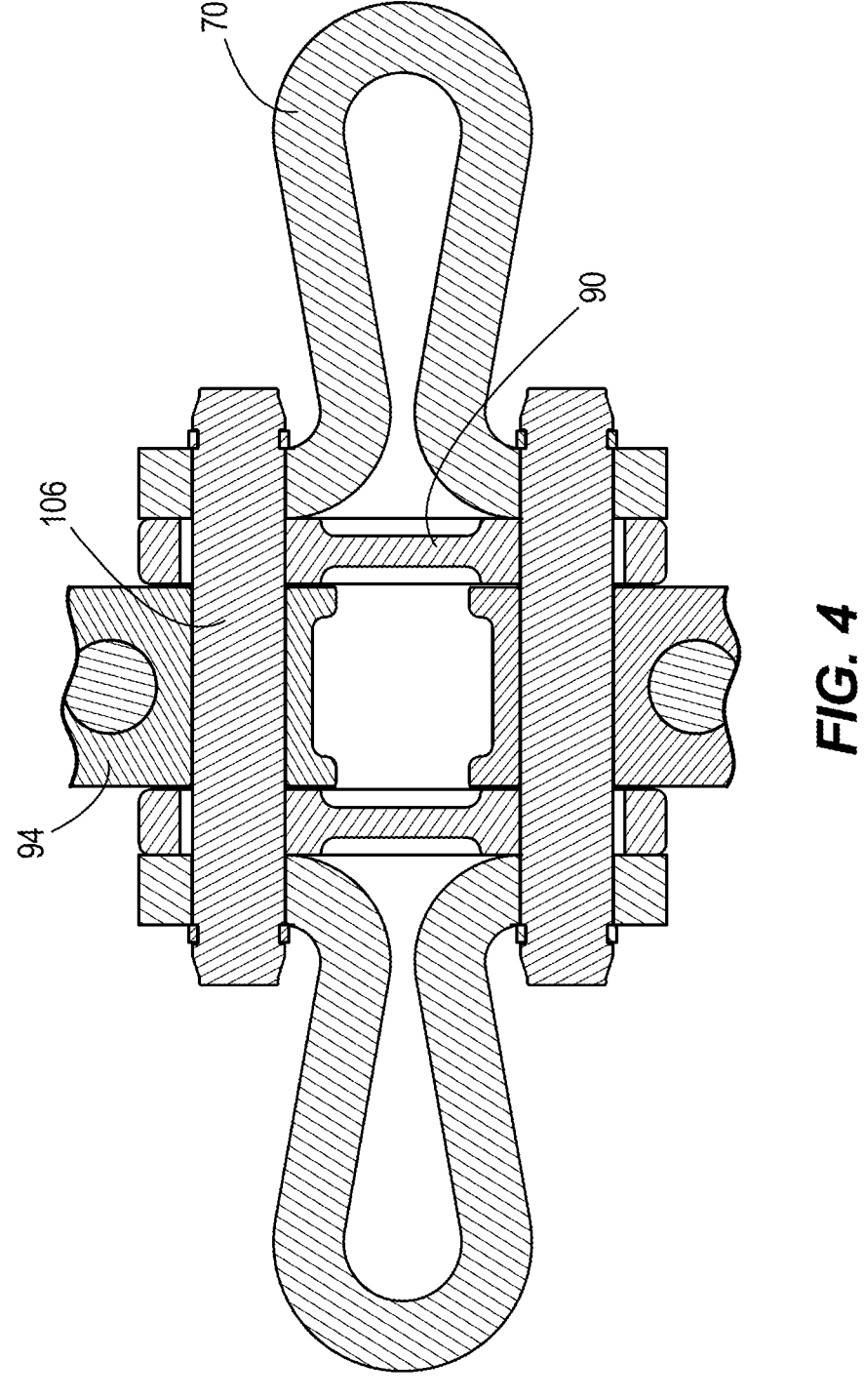
FIG. 4 is a section view of a portion of the chain conveyor of conveyor chain of FIG. 2, viewed along section 4-4.
Figure 5B:
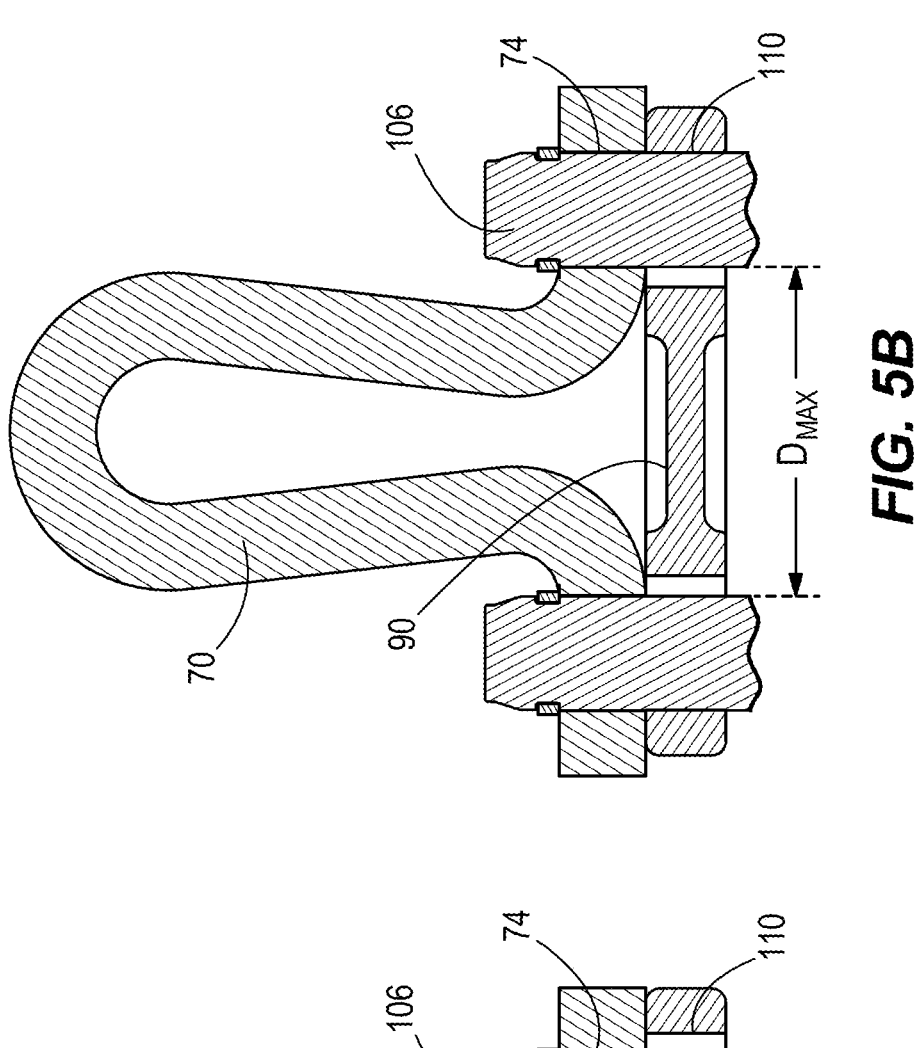
FIG. 5B is a section view of a portion of the chain conveyor unit of FIG. 4, including the resilient link in a stretched state.
Figure 5A:
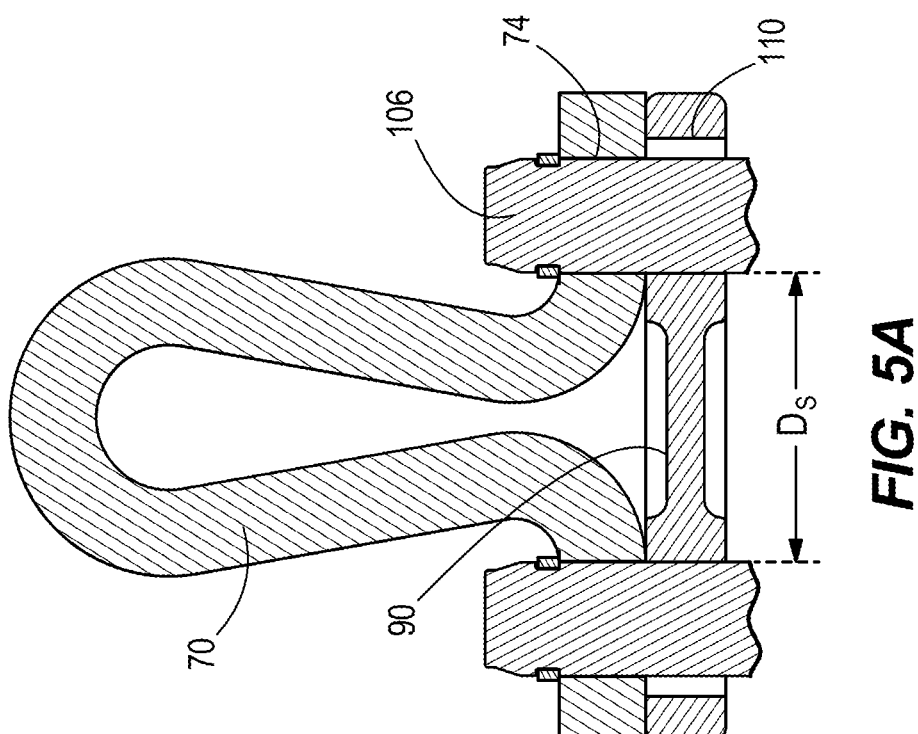
FIG. 5A is a section view of a portion of the chain conveyor unit of FIG. 4, including a resilient link in an undeformed state.

In the illustrated embodiment, a side link 90 is coupled to the spring link 70. The side link 90 may limit the extension/contraction of the spring link 70 to prevent the spring link 70 from extending beyond a maximum distance and/or contracting below a minimum distance. As shown in FIGS. 4 and 5, the side link 90 can include elongated pin openings 110 that are oval shaped, slotted, or elongated in the direction of travel of the conveyor chain 82. The elongated pin openings 110 of a side link 90 may be spaced apart such that a connecting pin 106 can be placed through each elongated pin opening 110 of the side link 90 and each pin opening 74 of the corresponding spring link 70 while the spring link 70 is in an undeformed state (i.e., when the pin openings 74 are a distance $D_S$ apart). The elongated pin openings 110 may also be elongated such that the distance between the pin openings 74 can increase up to a predetermined maximum distance $D_{MAX}$ as the spring link 70 is deformed during loading. While the spring link 70 is at the maximum distance, the connecting pins 106 engage the side link 90 in addition to the spring link 70 and transfer the load between adjacent connecting links 94, and the side link 90 inhibits the spring link 70 from deforming further. Thus, the spring links 70 can be protected from excessive deformation or breakage. Even if the spring link 70 is deformed to its maximum desired amount and excess loading is transmitted to the side link 90, the spring link 70 still acts as a shock absorber that mitigates abrupt loading on the components of the conveyor chain 82.

Figure 6:
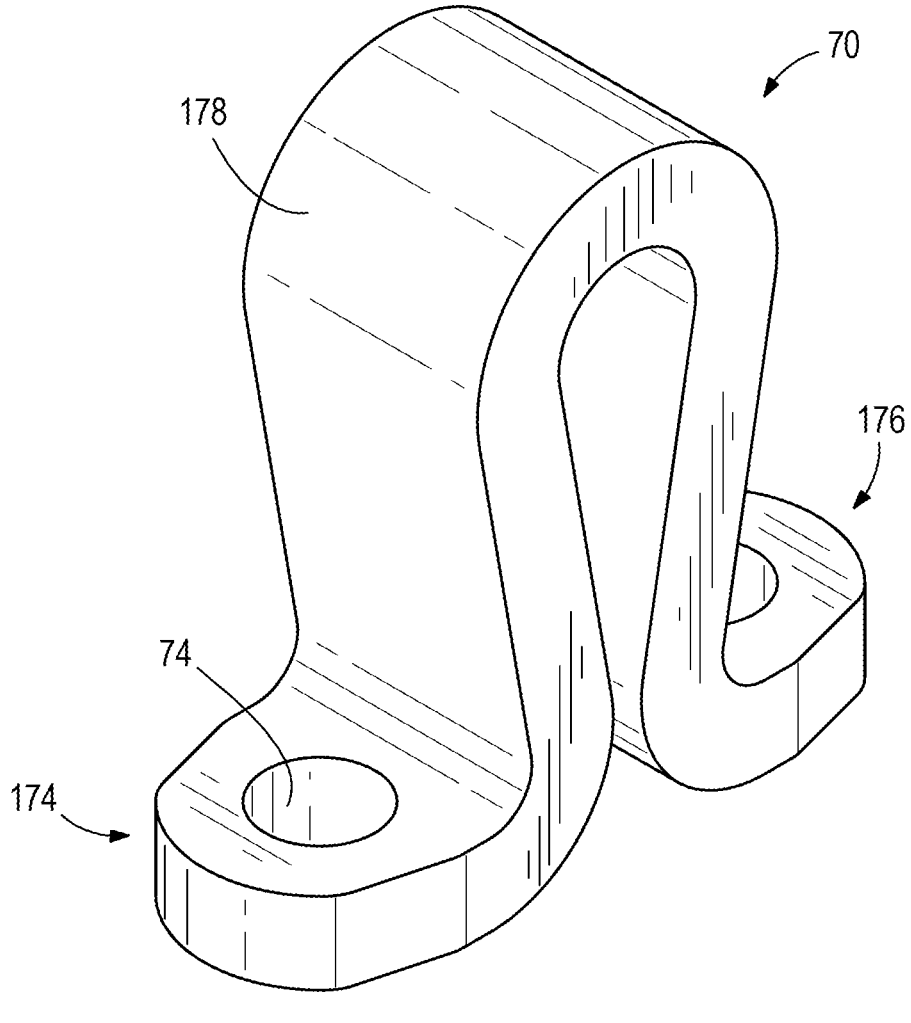
FIG. 6 is a perspective view of a resilient link according to the embodiment shown in FIG. 1.

The spring link 70 may have various configurations and may be made of various materials. In some embodiments, the spring link 70 may be formed from a spring steel or another elastomeric material. In one embodiment, as best shown in FIG. 6 (and as shown in FIGS. 2-5), the spring link 70 is a unitary body and includes a first end 174, a second end 176, and a deformable portion 178 positioned therebetween. The first end 174 and the second end 176 may be oriented in a common plane, and each end 174, 176 may contain a pin openings 74. In the illustrated embodiment, the deformable portion 178 protrudes from the first end 174 and the second end 176 at an angle and is substantially transverse to the common plane. The deformable portion 178 may have an arcuate profile, and may be integrally connected with the first end 174 and the second end 176 of the spring link 70. In some embodiments, the spring link 70 may be symmetric about a plane positioned between the first end 174 and the second end 176 and bisecting the spring link 70. In the illustrated embodiment, the spring link 70 has an omega shape as viewed in plan view from above the chain (see FIGS. 5A and 5B). Additional bends and other additional features, such as corrugations or varying thicknesses, could be incorporated in the deformable portion 178 to alter the stiffness of the spring link 70.

Figure 7A:
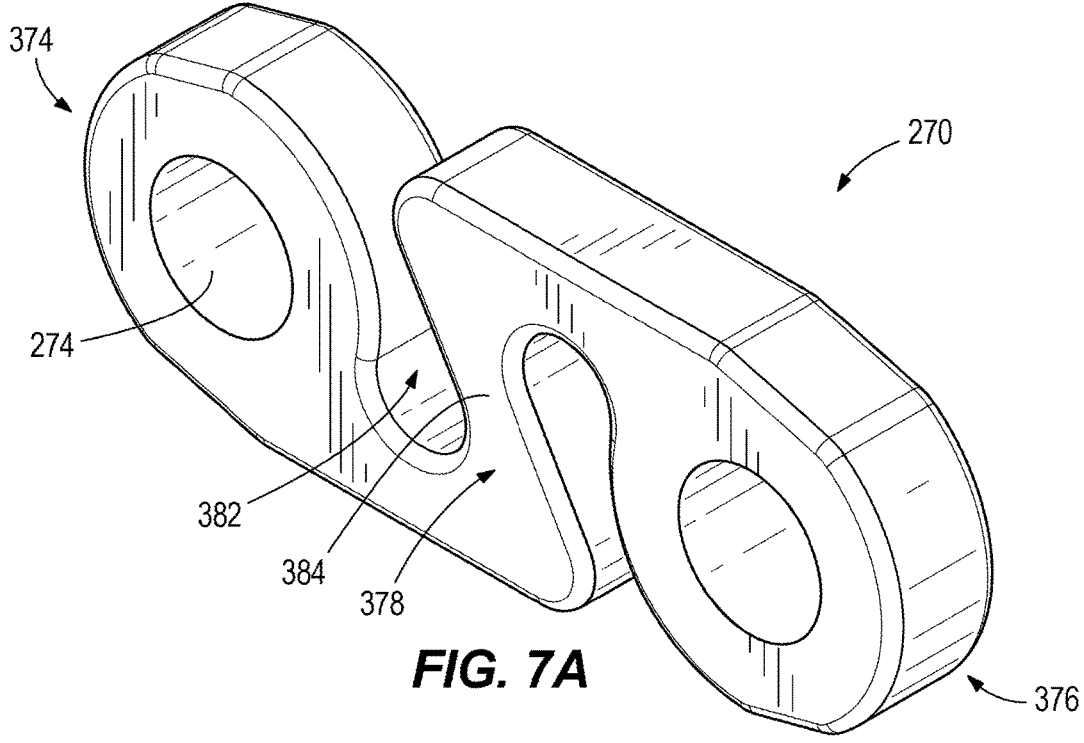
FIG. 7A is a perspective view of a resilient link according to another embodiment.
Figure 7B:
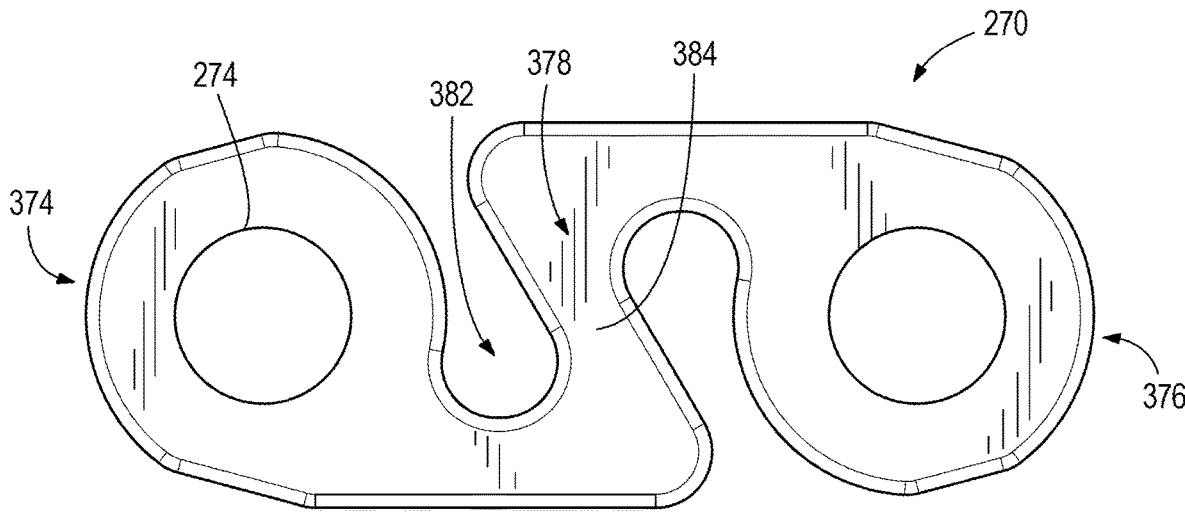
FIG. 7B is a front view of the resilient link of FIG. 7A.

FIGS. 7A and 7B illustrate another a spring link 270 according to another embodiment. The spring link 270 is similar to the spring link 70 shown in FIGS. 2-6, and similar features are identified with similar reference numbers, plus 200. Some aspects of the spring link 270 are described herein.

The spring link 270 includes pin openings 274 and a deformable portion 378. Spring link 270 is oriented in a plane and does not include a portion (such as the deformable portion 378) that extends in a direction transverse to the plane. The spring link 270 includes a first end 374 and second end 376, and one of the pin openings 274 is positioned adjacent each end 374, 376. The deformable portion 378 is positioned between the first end 374 and the second end 378, and the deformable portion 378 includes notches 382 positioned on alternate sides of the link 270, forming a bridge portion 384. In some embodiments, the spring link 270 is formed from a plate of material and the notches 382 are formed by removing material from the plate. In the illustrated embodiment, the notches 382 are configured such that the deformable portion 378 between the first and second end 374, 376 is substantially Z-shaped. In other embodiments, the deformable portion 378 may be formed in a different manner.

Figure 8:
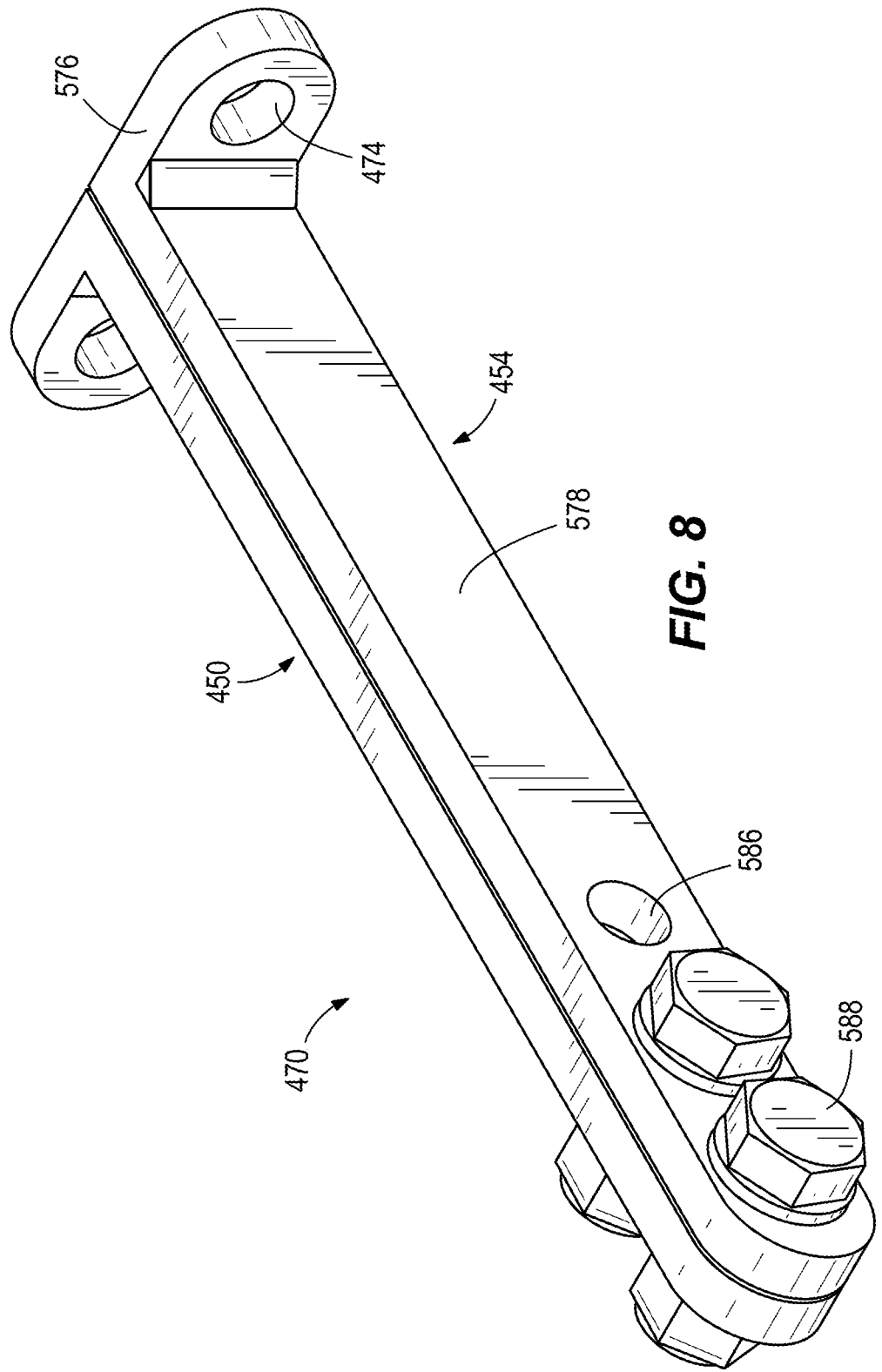
FIG. 8 is a perspective view of a resilient link according to another embodiment.

FIG. 8 illustrates a spring link 470 according to another embodiment. The spring link 470 is similar to the spring link 70 shown in FIGS. 2-6, and similar features are identified with similar reference numbers, plus 400. Some aspects of the spring link 470 are described herein.

The spring link 470 includes a first body 450 and a second body 454. Each body 450, 454 includes an end 576 and a deformable portion 578. A pin opening 474 extends through each end 576. In the illustrated embodiment, the end 576 of the first body 450 and the end 576 of the second body 454 are oriented in a common plane, and the deformable portion 578 of each body 450, 454 extends substantially perpendicular to the plane. Each deformable portion 578 further includes adjustment holes 586 for receiving a bolt or other fastener 588. The adjustment holes 586 of the first body 450 are aligned with adjustment holes 586 of the second body 454, and the first body 450 and the second body 454 are coupled together by the fasteners 588.

In the illustrated embodiment, the deformable portion 578 protrudes from the ends 576 and the adjustment holes 586 are positioned at a location that is furthest from the ends 576. The fasteners 588 hold the bodies 450, 454 together to form a single spring link 470 while still allowing for deformation and/or separation of the deformable portions 578 of the bodies 450, 454 when experiencing a loading force. Separation of the deformable portions 578 may permit a distance between the pin openings 474 to change. For a given spring link 470, the number and location of fasteners 588 in the adjustment holes 586 can be varied to adjust the rigidity of the assembled spring link 470 in the field. That is, one or more of the adjustment holes 586 may remain open during operation in order to achieve a desired rigidity/elasticity.

Figure 9:
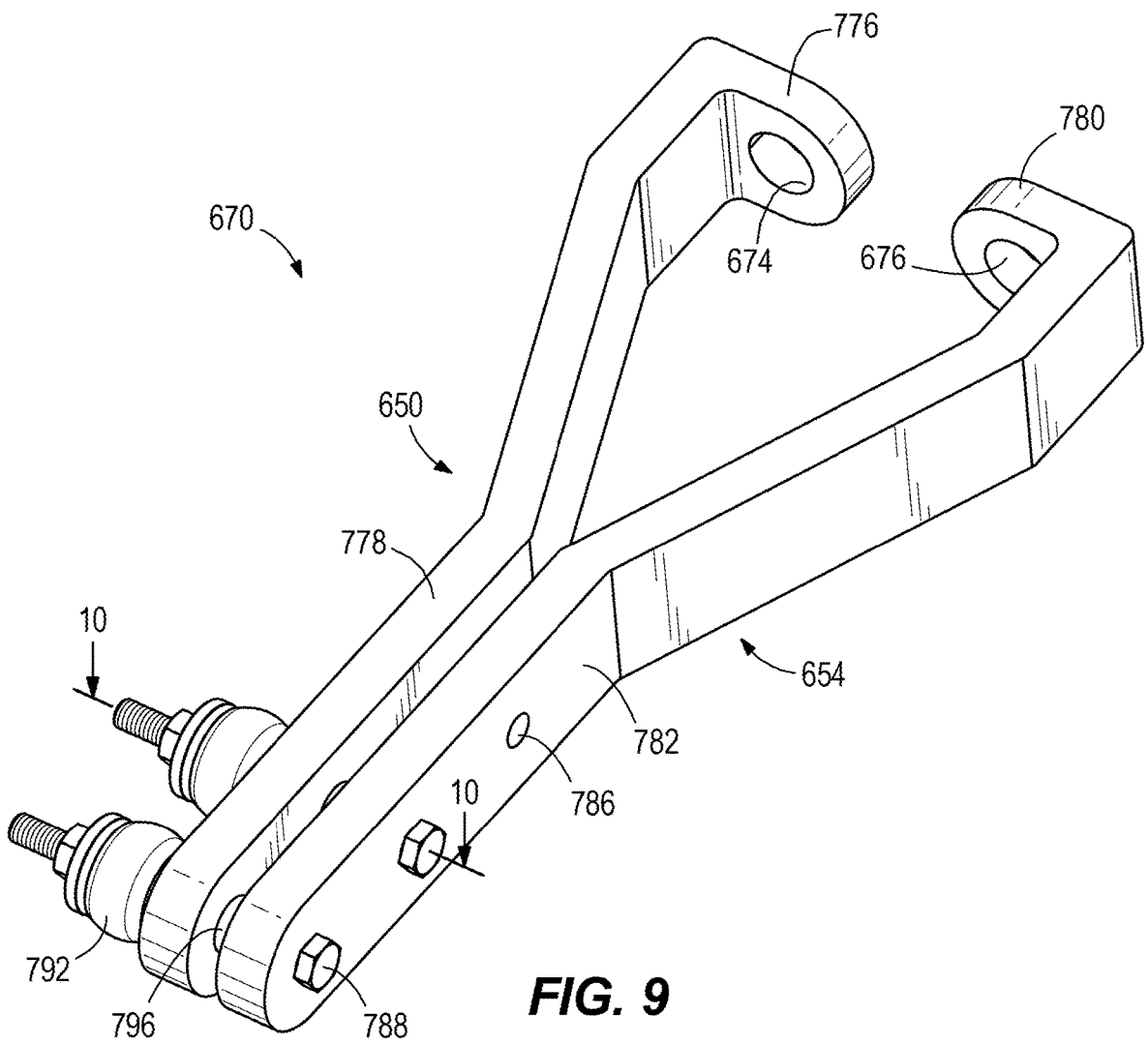
FIG. 9 is a perspective view of a resilient link according to another embodiment.
Figure 10:
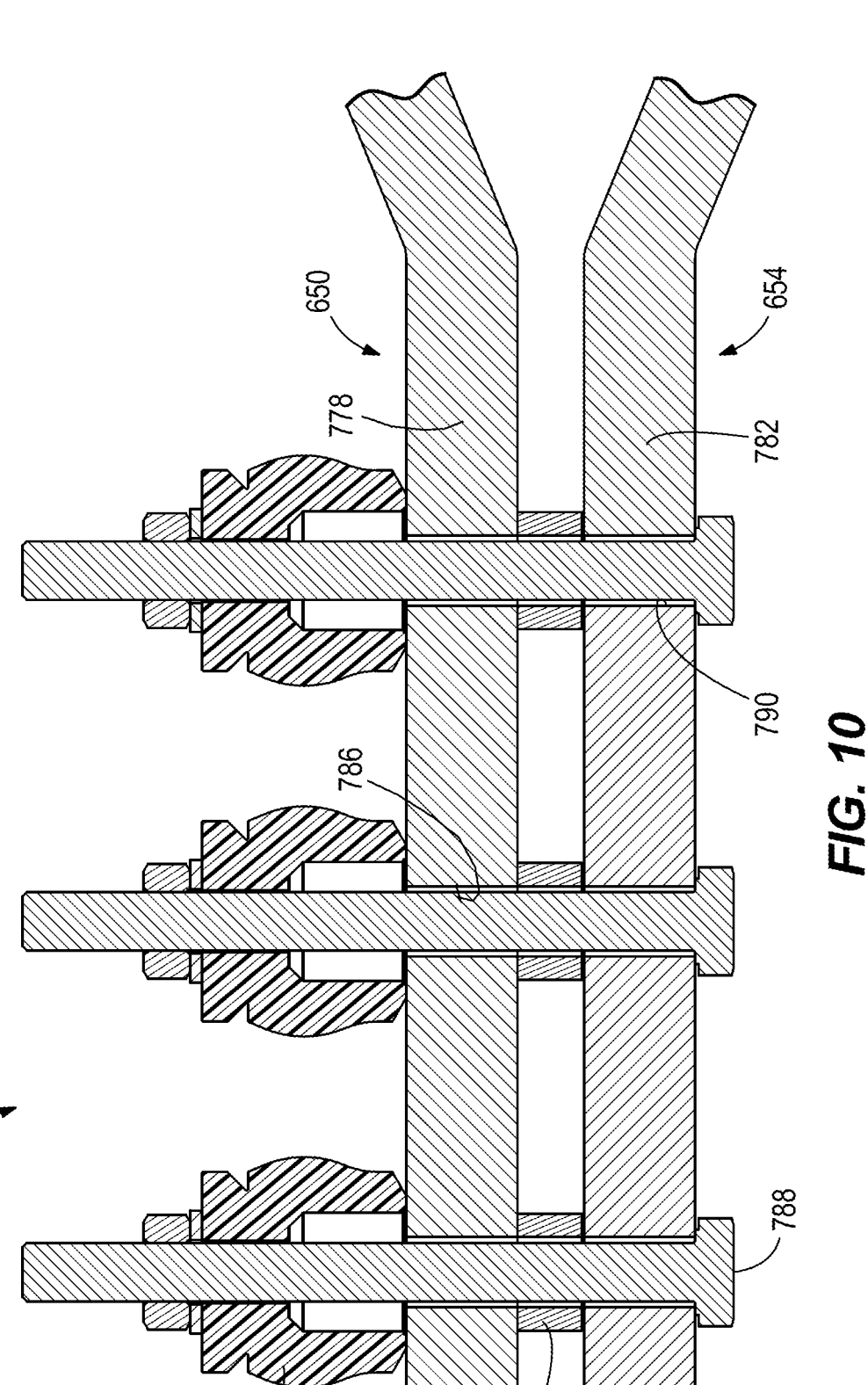
FIG. 10 is a section view of a portion of the resilient link of FIG. 9, viewed along section 10-10.

FIGS. 9 and 10 illustrate a spring link 670 according to another embodiment. The spring link 670 is similar to the spring link 470 shown in FIG. 8, and similar features are identified with similar reference numbers, plus 200. Some aspects of the spring link 670 are described herein.

The spring link 670 includes a first body 650 and a second body 654. The first body 650 includes an end 776 and a deformable portion 778, and the second body 654 includes an end 780 and a deformable portion 782. A pin opening 674, 676 extends through each of the ends 776, 780. In the illustrated embodiment, the end 776 of the first body 650 and the end 780 of the second body 654 are oriented in a common plane, and the deformable portion 778, 782 of each body 650, 654 extends in a direction that is substantially perpendicular to the plane. In the illustrated embodiment, a distal end portion of the deformable portion 778 may be oriented perpendicular to the end 776, while an intermediate portion of the deformable portion may be positioned between the distal end portion and the end 776 and oriented at an acute angle relative to the distal end portion. The second body 654 may include similar features. Each deformable portion 778, 782 further includes adjustment holes 786, 790 for receiving a bolt or other fastener 788. The adjustment holes 786 of the first body 650 are aligned with adjustment holes 790 (FIG. 10) of the second body 654, and the first body 650 and the second body 654 are coupled together by one or more fasteners 788.

In some embodiments, a resilient member (e.g., a shock absorber or boot 792) is positioned adjacent an end of an associated fastener 788, and the fastener 788 engages one of the bodies 650, 654 through the boot 792. The boot 792 may be made of a rubber or polymeric material or any other suitable material. The boot 792 may compress when a load is applied, and the boot 792 may return to an uncompressed state when the load is reduced or removed. In this way, the boot 792 can act as both a shock absorber and a dampener to reduce vibration. In some embodiments, the deformable portions 778, 782 of the bodies 650, 654 are not rigidly held a fixed distance apart. Rather, due to compression of the boot 792 under load, the distance between the deformable portions 778, 782 is allowed to change, which in turn permits the distance between pin openings 674, 676 to change.

Similarly, a gasket 796 may be inserted between the deformable portions 778, 782 of the bodies 650, 654. The gasket 796 may similarly be made of a rubber or polymeric material or any other material that can compress under a load and return to an uncompressed state when the load is reduced or removed. The gasket 796 may have openings to receive the fasteners 788, or, as shown in the illustrated embodiment, separate gaskets 796 may be used for each fastener 788.

In the illustrated embodiment, the deformable portions 778, 782 are coupled to the ends 776, 780 with some distance between the two. However, the deformable portions 778, 782 could be moved closer to the ends 776, 780 and compression of the boots 792 and/or gasket 796 would still allow for deformation of the spring link 670 and movement of the pin openings 674, 676 relative to each other. For a given spring link 670, the number and location of fasteners 788, boots 792, and/or gaskets 796 used in conjunction with the adjustment holes 786 can be varied to adjust the rigidity/elasticity of the assembled spring link 670 in the field. That is, one or more of the adjustment holes 786, 790 may remain open during operation in order to achieve a desired rigidity/elasticity. Similarly, the size and material type of the boots 792 and/or gaskets 796 may be selected to have a desirable amount of rigidity/elasticity, which in turn achieves a desired rigidity/elasticity of the overall spring link 670.

Figure 11:
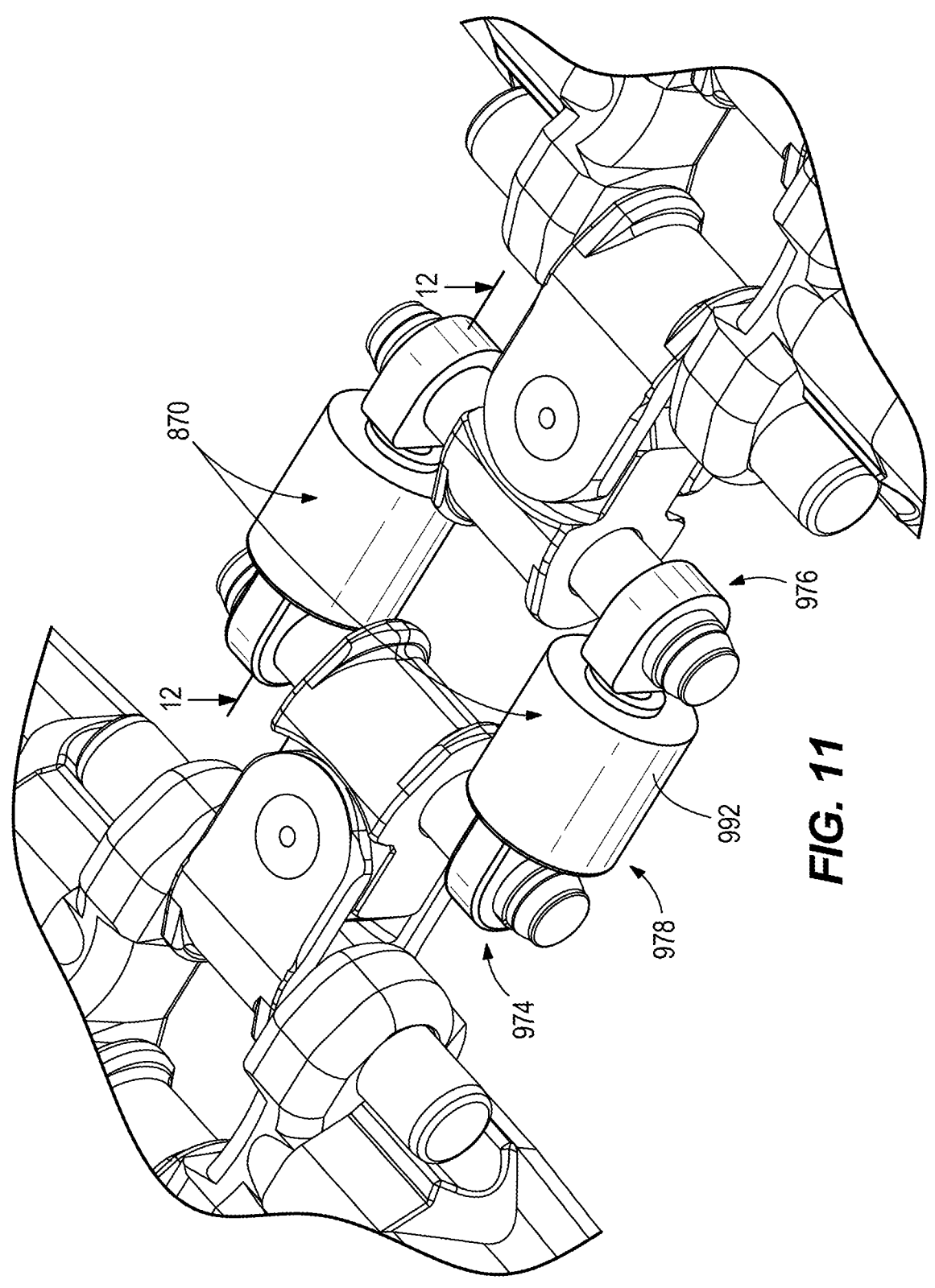
FIG. 11 is a perspective view of a resilient link according to another embodiment.
Figure 12:
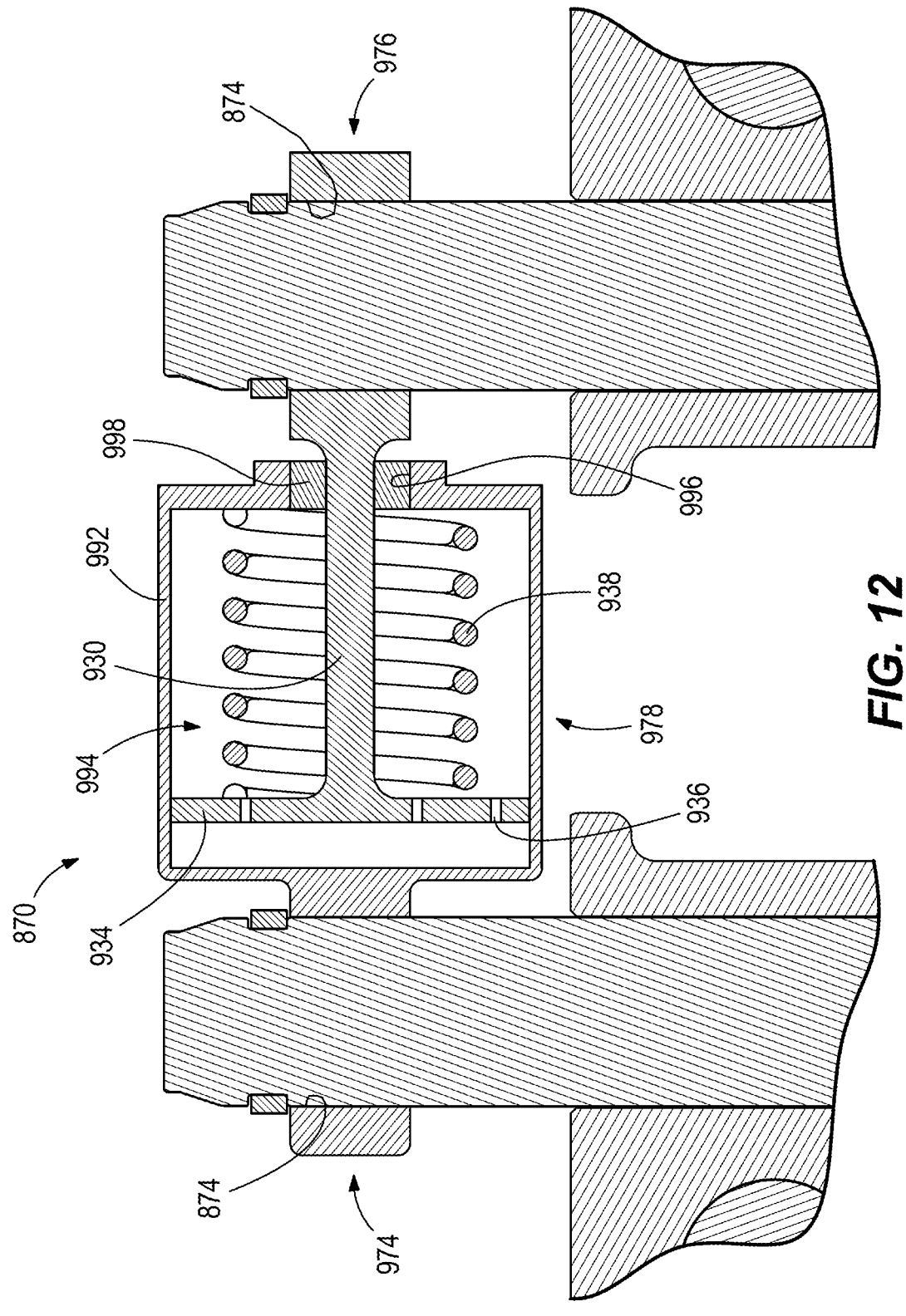
FIG. 12 is a section view of a portion of the resilient link of FIG. 11, viewed along section 12-12.

FIGS. 11 and 12 illustrate a spring link 870 according to another embodiment. The spring link 870 is similar to the spring link 70 shown in FIGS. 2-6, and similar features are identified with similar reference numbers, plus 800. Some aspects of the spring link 870 are described herein.

The spring link 870 includes a first end 974 and a second end 976, and a deformable portion 978. In the illustrated embodiment, a pin opening 874 is positioned adjacent each end 974, 976. The deformable portion 978 may be positioned between the first end 974 and the second end 978.

As best illustrated in FIG. 12, the deformable portion 978 includes a barrel 992 coupled to the first end 974 and a plunger 930 coupled to the second end 976. In the illustrated embodiment, the plunger 930 includes a rod and a piston 934 adjacent an end of the rod. The piston 934 is positioned within inside a chamber or hollow portion 994 of the barrel 992. In some embodiments, the piston 934 may fit in the hollow portion 994 with minimal tolerance between the barrel 992 and the piston 934. For example, as shown in the illustrated embodiment, the barrel 992 includes a cylindrical chamber 994 and the piston 934 has an outer diameter that is only slightly smaller than an inner diameter of the cylindrical chamber 994. The chamber 994 may be filled with a highly viscous fluid (e.g., glycerin) such that the movement of the piston 934 within the chamber 994 is slowed. Thus, shock loads experienced by the spring link 870 may be absorbed and dissipated by interaction between the fluid and the piston 934.

Referring to FIG. 12, a tolerance between the piston 934 and barrel 992 and the fluid within the chamber 994 may be selected to achieve higher or lower shock absorption. For example, if the piston 934 has an extremely tight fit with the barrel 992, the viscous fluid on one side of the piston 934 will resist displacement within the chamber 994. Providing a tight tolerance between the piston 934 and the wall of the chamber 994 and/or providing a fluid having a high viscosity will increase the stiffness of the spring link 870. Providing a large tolerance between the piston 934 and the wall of the chamber 994 and/or providing a fluid having a low viscosity will facilitate flow of the fluid within the chamber 994, which will provide a less stiff response. In addition, bleed-through holes 936 may also be included in the piston 934 to further adjust how easily the fluid can be displaced and how easily the piston 934 can pass through the fluid in the chamber 994. The number and size of bleed-through holes 936 may be selected to achieve a desired stiffness in the response of the spring link 870.

In some embodiments, an opening 996 may be positioned adjacent an end of the chamber 994 that is farthest from the first end 974. The opening 996 can receive the plunger 930 and the opening may further include a seal 998 that allows movement of the plunger 930 through the hole while inhibiting the fluid from escaping the chamber 994. Also, the chamber 994 may include one or more springs 938 that interact between one or both ends of the chamber 994 and the piston 934 to bias the piston 934 to a nominal operating position within the chamber 994 that corresponds to a standard distance $D_S$ between the pin openings 874 of the spring link 870.

Although the spring link is described above with respect to a conveyor for a continuous mining machine, it is understood that the spring link may be incorporated into other types of conveyors including but not limited to conveyors for roadheaders and entry drivers, as well as loading and hauling machines including but not limited to shuttle cars, battery haulers, or other types.

Although aspects have been described in detail with reference to certain preferred embodiments, variations and modifications exist within the scope and spirit of one or more independent aspects as described.

What is claimed is:

1. A link for a conveyor chain, the conveyor chain configured to convey material in a direction of travel, the link comprising:
   a first end configured to be coupled to a first adjacent link;
   a second end opposite the first end, the second end configured to be coupled to a second adjacent link; and
   a deformable portion positioned between the first end and the second end, the deformable portion configured to elastically deform in a linear direction parallel to the direction of travel of the conveyor chain in response to loads exerted parallel to the direction of travel of the conveyor chain, the deformable portion being movable between an undeformed position and an extended position, wherein, while in the undeformed position, the first end and the second end are spaced apart from one another by a first linear distance, wherein, while in the extended position, the first end and the second end are spaced apart from one another by a second linear distance greater than the first linear distance.

2. The link of claim 1, wherein the first end and the second end are substantially coplanar, wherein the deformable portion protrudes at least partially in a direction transverse to the direction of travel between the first end and the second end.

3. The link of claim 2, wherein the deformable portion has an arcuate shaped profile extending outwardly from the first end and the second end.

4. The link of claim 3, wherein the deformable portion is symmetric about a plane that evenly divides the first end from the second end.

5. The link of claim 1, further comprising:
   a first opening positioned adjacent the first end and extending in a direction transverse to the direction of travel, the first opening configured to receive a first connecting member; and
   a second opening positioned adjacent the second end and extending in the direction transverse to the direction of travel, the second opening configured to receive a second connecting member.

6. The link of claim 1, wherein the deformable portion has a substantially omega-shaped profile.

7. The link of claim 1, wherein the deformable portion is formed from at least one of a spring steel or an elastomeric material.

8. The link of claim 1, further comprising a limiting body coupled to the first end and the second end, the limiting body being more resistant to deformation than the deformable portion, the limiting body thereby inhibiting the deformable portion from deforming beyond a predetermined limit.

9. The link of claim 8, further comprising a first opening positioned adjacent the first end and a second opening positioned adjacent the second end,
   wherein the limiting body includes a first limiting body end and a second limiting body end, the first limiting body end including a first elongated opening, the second limiting body end including a second elongated opening, wherein the first elongated opening overlaps with the first opening in a direction transverse to the direction of travel, and the second elongated opening overlaps with the second opening in a direction transverse to the direction of travel, wherein a connecting member extending through the first opening is slidable within the first elongated opening in a direction parallel to the direction of travel as the deformable portion is deformed.

10. The link of claim 1, wherein the first end is positioned on a first body, wherein the second end is positioned on a second body, the first body and the second body each protruding in a direction transverse to the direction of travel, wherein the deformable portion includes a distal end of the first body and a distal end of the second body, the distal end of the first body and the distal end of the second body coupled to one another by at least one fastener.

11. The link of claim 10, further comprising an elastomeric member coupled to an end of the fastener and positioned adjacent one of the first body and the second body.

12. The link of claim 10, further comprising an elastomeric member positioned between the first body and the second body.

13. The link of claim 1, wherein the deformable portion includes a barrel and a piston positioned within the barrel, the barrel including a fluid to resist movement of the piston.

14. A link assembly for a conveyor chain, the conveyor chain configured to convey material in a direction of travel, the link assembly comprising:
a resilient link including,
   a first end configured to be coupled to a first adjacent link; and
   a second end opposite the first end, the second end configured to be coupled to a second adjacent link, the resilient link configured to elastically deform in response to loads exerted in a direction parallel to the direction of travel of the conveyor chain thereby changing a distance between the first end and the second end; and
a limiting body including,
   a first limiting body end configured to be coupled to the first end of the resilient link; and
   a second limiting body end configured to be coupled to the second end of the resilient link, the first limiting body end and the second limiting body end being configured to inhibit the distance between the first end of the resilient link and the second end of the resilient link from moving outside of a predetermined range.

15. The link assembly of claim 14, wherein the limiting body further includes a first limiting body opening and a second limiting body opening, at least one of the first limiting body opening and the second limiting body opening having an elongated or eccentric cross-section.

16. The link assembly of claim 15, wherein the elongated or eccentric cross-section has its major axis extending in a direction parallel to the direction of travel of the conveyor chain.

17. The link assembly of claim 14, further comprising a first connecting member and a second connecting member, wherein the resilient link includes a first opening and a second opening, wherein the limiting body includes a first limiting body opening and a second limiting body opening, and wherein the first opening and first limiting body opening are configured to correspond to a cross-sectional shape and size of the first connecting member and the second opening and second limiting body opening are configured to correspond to a cross-sectional shape and size of the second connecting member, wherein at least one of the first limiting body opening and the second limiting body opening is configured to be larger than its respective connecting member in a direction parallel to the direction of travel of the conveyor chain to permit movement between the respective connecting member and the at least one limiting body opening.

18. The link assembly of claim 14, further comprising:
a first connecting member;
a second connecting member;
a secondary link; and
a secondary limiting body,
wherein the secondary link and the secondary limiting body are coupled to the resilient link and the limiting body by the first connecting member and the second connecting member.

19. A conveyor chain, the conveyor chain configured to convey material in a direction of travel, the conveyor chain comprising:
a first flight link including a flight bar extending laterally away from a centerline of the conveyor chain;
a second flight link including a flight bar extending laterally away from the centerline of the conveyor chain; and
a resilient link including, a first end, a second end opposite the first end, and a deformable portion positioned between the first end and the second end, the deformable portion extending away from and perpendicular to the first flight link, the deformable portion configured to elastically deform in a linear direction parallel to the direction of travel of the conveyor chain in response to loads exerted parallel to the direction of travel of the conveyor chain, the deformable portion being movable between an undeformed position and an extended position, wherein, while in the undeformed position, the first end and the second end are spaced apart from one another by a first linear distance, wherein, while in the extended position, the first end and the second end are spaced apart from one another by a second linear distance greater than the first linear distance.

20. The conveyor chain of claim 19, wherein the resilient link is coupled to at least one of the first flight link or the second flight link by at least one connecting member.

21. The conveyor chain of claim 19, further comprising:
an intermediate link positioned between the first flight link and the second flight link; and
at least one connecting member coupling the first flight link, the intermediate link, and the second flight link.

22. The conveyor chain of claim 21, wherein the resilient link is coupled to the intermediate link by a second connecting member.

23. The conveyor chain of claim 22, further comprising a limiting body coupled to the first end and the second end, the limiting body being more resistant to deformation than the deformable portion, the limiting body thereby inhibiting the deformable portion from deforming beyond a predetermined limit.

24. The conveyor chain of claim 19, wherein the first end and the second end are substantially coplanar, wherein the deformable portion protrudes at least partially in a direction transverse to the direction of travel between the first end and the second end.

* * * * *